United States Patent
Lam et al.

(10) Patent No.: US 10,387,387 B2
(45) Date of Patent: Aug. 20, 2019

(54) ENABLING MULTI-TENANT ACCESS TO RESPECTIVE ISOLATED DATA SETS ORGANIZED USING DIFFERENT APPLICATION SCHEMAS

(71) Applicant: Oracle International Corporation, Redwood Shores, CA (US)

(72) Inventors: Yu Jun Lam, Folsom, CA (US); Laurentiu Busuioc, Livermore, CA (US); Yongran Huang, San Jose, CA (US); Anand Maurya, Sunnyvale, CA (US); Peter Ondrejka, Dunakeszi (HU); Laszlo Nyakas, Szigethalom (HU); Kyle I. Parent, San Mateo, CA (US); Paolo Juvara, San Francisco, CA (US); Wansoo Park, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 531 days.

(21) Appl. No.: 14/973,256

(22) Filed: Dec. 17, 2015

(65) Prior Publication Data

US 2017/0177625 A1   Jun. 22, 2017

(51) Int. Cl.
G06F 16/00 (2019.01)
G06F 16/21 (2019.01)
G06F 16/2455 (2019.01)

(52) U.S. Cl.
CPC ......... *G06F 16/211* (2019.01); *G06F 16/213* (2019.01); *G06F 16/24553* (2019.01)

(58) Field of Classification Search
CPC ......... G06F 17/30292; G06F 17/30377; G06F 17/30569; G06F 17/30294; G06F 17/30297; G06F 17/30289; G06F 17/30306; G06F 16/213; G06F 16/211; G06F 16/248; G06F 16/252; G06F 16/9535; G06F 16/24552

See application file for complete search history.

(56) References Cited

U.S. PATENT DOCUMENTS

| | | | |
|---|---|---|---|
| 4,586,134 A | 4/1986 | Norstedt |
| 4,664,528 A | 5/1987 | Rodgers et al. |
| 4,823,122 A | 4/1989 | Mann et al. |
| 5,047,922 A | 9/1991 | Borkar |

(Continued)

OTHER PUBLICATIONS

Aulbach, Stefan, et al. "Multi-tenant databases for software as a service: schema-mapping techniques." Proceedings of the 2008 ACM SIGMOD international conference on Management of data. ACM, 2008.*

(Continued)

*Primary Examiner* — Nan Hutton
(74) *Attorney, Agent, or Firm* — Invoke

(57) ABSTRACT

Multi-tenant access to respective isolated data sets organized using different application schemas is disclosed. Multiple tenants store respective data sets in separate datastores. The datastores are organized using different application schemas, each derived from a same base schema. However, the tenants share access to a same application. The application receives a first request from a first tenant and a second request from a second tenant. The application serves the first request by accessing a first data set organized using a first application schema. The application serves the second request by accessing a second data set using a second application schema.

20 Claims, 7 Drawing Sheets

(56) References Cited

U.S. PATENT DOCUMENTS

| | | |
|---|---|---|
| 5,247,671 A | 9/1993 | Adkins et al. |
| 5,289,461 A | 2/1994 | De Nijs |
| 5,319,754 A | 6/1994 | Meinecke et al. |
| 5,392,285 A | 2/1995 | Kurts |
| 5,448,559 A | 9/1995 | Hayter et al. |
| 5,530,905 A | 6/1996 | Nichols et al. |
| 5,553,239 A | 9/1996 | Heath et al. |
| 5,553,242 A | 9/1996 | Russell et al. |
| 5,596,745 A | 1/1997 | Lai et al. |
| 5,598,536 A | 1/1997 | Slaughter et al. |
| 5,600,722 A | 2/1997 | Yamaguchi et al. |
| 5,600,791 A | 2/1997 | Carlson et al. |
| 5,617,540 A | 4/1997 | Civanlar et al. |
| 5,633,861 A | 5/1997 | Hanson et al. |
| 5,642,515 A | 6/1997 | Jones et al. |
| 5,682,534 A | 10/1997 | Kapoor et al. |
| 5,684,800 A | 11/1997 | Dobbins et al. |
| 5,734,659 A | 3/1998 | Mann et al. |
| 5,740,175 A | 4/1998 | Wakeman et al. |
| 5,761,507 A | 6/1998 | Govett |
| 5,771,349 A | 6/1998 | Picazo et al. |
| 5,774,660 A | 6/1998 | Brendel et al. |
| 5,774,668 A | 6/1998 | Choquier et al. |
| 5,790,800 A | 8/1998 | Gauvin et al. |
| 5,805,816 A | 9/1998 | Picazo et al. |
| 5,805,827 A | 9/1998 | Chau et al. |
| 5,805,920 A | 9/1998 | Sprenkle et al. |
| 5,828,879 A | 10/1998 | Bennett |
| 5,873,102 A | 2/1999 | Bridge et al. |
| 5,890,167 A | 3/1999 | Bridge et al. |
| 5,944,823 A | 8/1999 | Jade et al. |
| 5,963,556 A | 10/1999 | Varghese et al. |
| 5,974,463 A | 10/1999 | Warrier et al. |
| 5,978,849 A | 11/1999 | Khanna |
| 5,987,430 A | 11/1999 | Van et al. |
| 6,006,264 A | 12/1999 | Colby et al. |
| 6,088,728 A | 7/2000 | Bellemore et al. |
| 6,138,120 A | 10/2000 | Gongwer et al. |
| 6,310,883 B1 | 10/2001 | Mann et al. |
| 6,321,235 B1 | 11/2001 | Bird |
| 6,510,434 B1 | 1/2003 | Anderson et al. |
| 6,804,671 B1 | 10/2004 | Loaiza et al. |
| 6,950,848 B1 | 9/2005 | Yousefi Zadeh |
| 7,035,931 B1 | 4/2006 | Zayas et al. |
| 7,039,654 B1 | 5/2006 | Eder |
| 7,136,825 B2 | 11/2006 | Araki et al. |
| 7,174,379 B2 | 2/2007 | Agarwal et al. |
| 7,346,690 B1 | 3/2008 | Sinha et al. |
| 7,506,034 B2 | 3/2009 | Coates et al. |
| 7,512,686 B2 | 3/2009 | Berg |
| 7,822,717 B2 | 10/2010 | Kapoor et al. |
| 8,364,648 B1 | 1/2013 | Sim-Tang |
| 8,943,181 B2 | 1/2015 | Kasten et al. |
| 9,684,561 B1 | 6/2017 | Yan et al. |
| 2001/0027406 A1 | 10/2001 | Araki et al. |
| 2002/0112022 A1 | 8/2002 | Kazar et al. |
| 2002/0143733 A1 | 10/2002 | Mukkamalla et al. |
| 2002/0147652 A1 | 10/2002 | Gheith et al. |
| 2003/0023572 A1 | 1/2003 | Jowell et al. |
| 2003/0061537 A1 | 3/2003 | Cha et al. |
| 2003/0065986 A1 | 4/2003 | Fraenkel et al. |
| 2003/0081748 A1 | 5/2003 | Lipinski |
| 2003/0172145 A1 | 9/2003 | Nguyen |
| 2003/0208523 A1 | 11/2003 | Gopalan et al. |
| 2003/0229695 A1 | 12/2003 | Mc Bride |
| 2004/0030801 A1 | 2/2004 | Moran et al. |
| 2004/0117375 A1 | 6/2004 | Saha et al. |
| 2004/0176996 A1 | 9/2004 | Powers et al. |
| 2004/0205101 A1 | 10/2004 | Radhakrishnan |
| 2004/0221031 A1 | 11/2004 | Desai |
| 2004/0257985 A1 | 12/2004 | Sahai et al. |
| 2004/0267809 A1 | 12/2004 | East et al. |
| 2005/0038831 A1 | 2/2005 | Souder et al. |
| 2005/0038833 A1 | 2/2005 | Colrain et al. |
| 2005/0262183 A1 | 11/2005 | Colrain et al. |
| 2006/0143217 A1 | 6/2006 | Stanev et al. |
| 2007/0083563 A1 | 4/2007 | Souder et al. |
| 2007/0100912 A1 | 5/2007 | Pareek et al. |
| 2007/0244918 A1 | 10/2007 | Lee et al. |
| 2008/0027769 A1 | 1/2008 | Eder |
| 2008/0155688 A1 | 6/2008 | Casazza |
| 2009/0037769 A1* | 2/2009 | Babkin ............ G06F 17/30516 714/15 |
| 2009/0183225 A1 | 7/2009 | Malakapalli et al. |
| 2009/0215469 A1 | 8/2009 | Fisher et al. |
| 2010/0185733 A1 | 7/2010 | Hon et al. |
| 2010/0205153 A1 | 8/2010 | Lamm |
| 2010/0250712 A1 | 9/2010 | Ellison et al. |
| 2010/0318570 A1 | 12/2010 | Narasinghanallur et al. |
| 2011/0004586 A1 | 1/2011 | Cherryholmes et al. |
| 2011/0060724 A1 | 3/2011 | Chan |
| 2011/0087633 A1 | 4/2011 | Kreuder et al. |
| 2011/0112901 A1 | 5/2011 | Fried et al. |
| 2011/0126118 A1 | 5/2011 | Bergeron et al. |
| 2011/0258243 A1* | 10/2011 | Katte .................. H04L 67/2847 707/827 |
| 2011/0307450 A1 | 12/2011 | Hahn et al. |
| 2011/0314035 A1 | 12/2011 | Brunet et al. |
| 2012/0075648 A1 | 3/2012 | Keys et al. |
| 2012/0079080 A1 | 3/2012 | Pishevar |
| 2012/0109926 A1 | 5/2012 | Novik et al. |
| 2012/0226659 A1 | 9/2012 | Ball et al. |
| 2012/0227086 A1 | 9/2012 | Dale et al. |
| 2013/0085742 A1 | 4/2013 | Barker et al. |
| 2013/0117237 A1 | 5/2013 | Thomsen et al. |
| 2013/0145006 A1* | 6/2013 | Tammam ............. G06F 9/5027 709/223 |
| 2013/0198824 A1 | 8/2013 | Hitchcock et al. |
| 2013/0212068 A1 | 8/2013 | Talius et al. |
| 2013/0226816 A1 | 8/2013 | Chory et al. |
| 2013/0262513 A1* | 10/2013 | Rau .......................... G06F 17/30 707/779 |
| 2014/0006344 A1 | 1/2014 | Narasinghanallur et al. |
| 2014/0090084 A1 | 3/2014 | Goodinson |
| 2014/0095452 A1 | 4/2014 | Lee et al. |
| 2014/0095530 A1 | 4/2014 | Lee et al. |
| 2014/0095546 A1 | 4/2014 | Kruglikov et al. |
| 2014/0164318 A1 | 6/2014 | Tsai et al. |
| 2014/0164331 A1* | 6/2014 | Li ....................... G06F 11/1471 707/648 |
| 2014/0222824 A1 | 8/2014 | Joshi et al. |
| 2015/0254240 A1 | 9/2015 | Li et al. |
| 2016/0094584 A1 | 3/2016 | Mehta et al. |
| 2016/0119155 A1* | 4/2016 | Marlow .................. H04L 12/16 455/414.1 |

OTHER PUBLICATIONS

Foping, Franclin S., et al. "A new hybrid schema-sharing technique for multitenant applications." 2009 Fourth International Conference on Digital Information Management. IEEE, 2009.*

Wang, Zhi Hu, et al. "A study and performance evaluation of the multi-tenant data tier design patterns for service oriented computing." 2008 IEEE International Conference on e-Business Engineering. IEEE, 2008.*

Appzero, "AppZero is the Fastest and Most Flexible Way to Move Server Applications to and Across Any Clouds or Datacenter Servers-With no Code Change and Zero Lock-in", AppZero, 2013, 1 page.

Appzero, "Moving Enterprise Apps to the Cloud", AppZero, Cloud migration: enterprise apps on the move, Copyright 2013, 9 pages.

Zhu, Yangpeng, "A Platform for Changing Legacy Application to Multi-tenant Model", International Journal of Multimedia and Ubiquitous Engineering, vol. 9, No. 8, 2014, pp. 407-418.

Wu, Jiyi, et al. "Cloud storage as the infrastructure of cloud computing." Intelligent Computing and Cognitive Informatics (ICICCI), 2010 International Conference on. IEEE, 2010.

Tsai, Wei-Tek, Xin Sun, and Janaka Balasooriya. "Service-oriented cloud computing architecture." Information Technology: New Generations (ITNG), 2010 Seventh International Conference on. IEEE, 2010.

(56) References Cited

OTHER PUBLICATIONS

Dillon, Tharam, Chen Wu, and Elizabeth Chang. "Cloud computing: issues and challenges." Advanced Information Networking and Applications (AINA), 2010 24th IEEE International Conference on. Ieee, 2010.
Bhoyar, Rahul, and Nitin Chopde. "Cloud computing: Service models, types, database and issues." International Journal of Advanced Research in Computer Science and Software Engineering 3.3 (2013).
Sellis Tim, "Multiple-query Optimization", ACM Transactions on Database Systems, dated Mar. 1988.
Rajeev Kumar Jha: "Container Database and Pluggable Database (CDB& PDB)", Aug. 8, 2012 (Aug. 8, 2012), pp. 1-2, XP055091522, Retrieved from the Internet: URL:http://rajeevjhaoracle.wordpress.com/2012/08/08/container-database-and-pluggable-database-cdb-pdb/-database-cdb-pdb/ [retrieved on Dec. 4, 2013].
Preimesberger, Chris, "Oracle Profits Up, but Revenues Slip" Oracle, dated Sep. 20, 2012, 2 pages.
Pachot, Frank, "Oracle 12cR2: MAX_PDBS", dated Nov. 11, 2016, https://blog.dbi-services.com/oracle-12cr2-max_pdbs/, 12 pages.
Oracle7 Enterprise Backup Utility Administrators's Guide, Copyright 1997, Oracle Corporation.
Oracle Base, Multitenant: Create and Configure a Pluggable Database (PDB) In Oracle Database 12c Release 1 (12.1), dated Jan. 8, 2014.
Muhamnad Anwar "How to install Oracle 12c Multitenant Pluggable Database", Feb. 24, 2012.
Francisco Munoz et al., "Oracle Database 12c Backup and Recovery Survival Guide", dated Sep. 24, 2013, 8 pages.
Dominic Betts et al., "Developing Multi-Tenant Applications for The Cloud," 3rd Edition, Microsoft, 2012, 246 pages.
DBA I, Practice-Control and Redo Log Files, Computer Science and Engineering Department, Nov. 1, 2009, http://andrei.clubcisco.ro/cursuri/5master/abd/4._Control_and_Redo_Log_Files.pdf.
Das et al., "Albatross: Lightweight Elasticity in Shared Storage Databases for the Cloud Using Live Data Migration", Proceedings of the VLDB Endowment, vol. 4 No. 8 Copyright, dated 2011, 12 pages.
Anonymous: "Oracle-Base—Multitenant: Overview of Container Databases (CDB) and Pluggable Databases (PDB)", dated Mar. 3, 2014, 4 pages.
Anonymous, :An Oracle White Paper Oracle Database Appliance: Migration Strategies, dated Jun. 2012, 13 pages.

* cited by examiner

Page 550

Heading 552: Welcome, HomeImprove Corp. — Your departments

Data Set 554:

| Department | Manager | Location | Type |
|---|---|---|---|
| Manufacturing | Bob Brown | CA | OnSite |
| Sales | Chris Carl | MA | Branch |
| Marketing | Daphne Doe | NY | Remote |

Fields 556: Department, Manager, Location, Type

Button 558: Add Department

Page 560

Heading 562: Welcome, LarryProperties Inc. — Office management section

Data Set 564:

| Office | Supervisor | Building |
|---|---|---|
| Lobby | Earl Ender | A |
| Break Room | Frank Fu | A |
| Conference Room | Gina Gray | E |

Fields 566: Office, Supervisor, Building

Button 568: Add Office

FIG. 4B

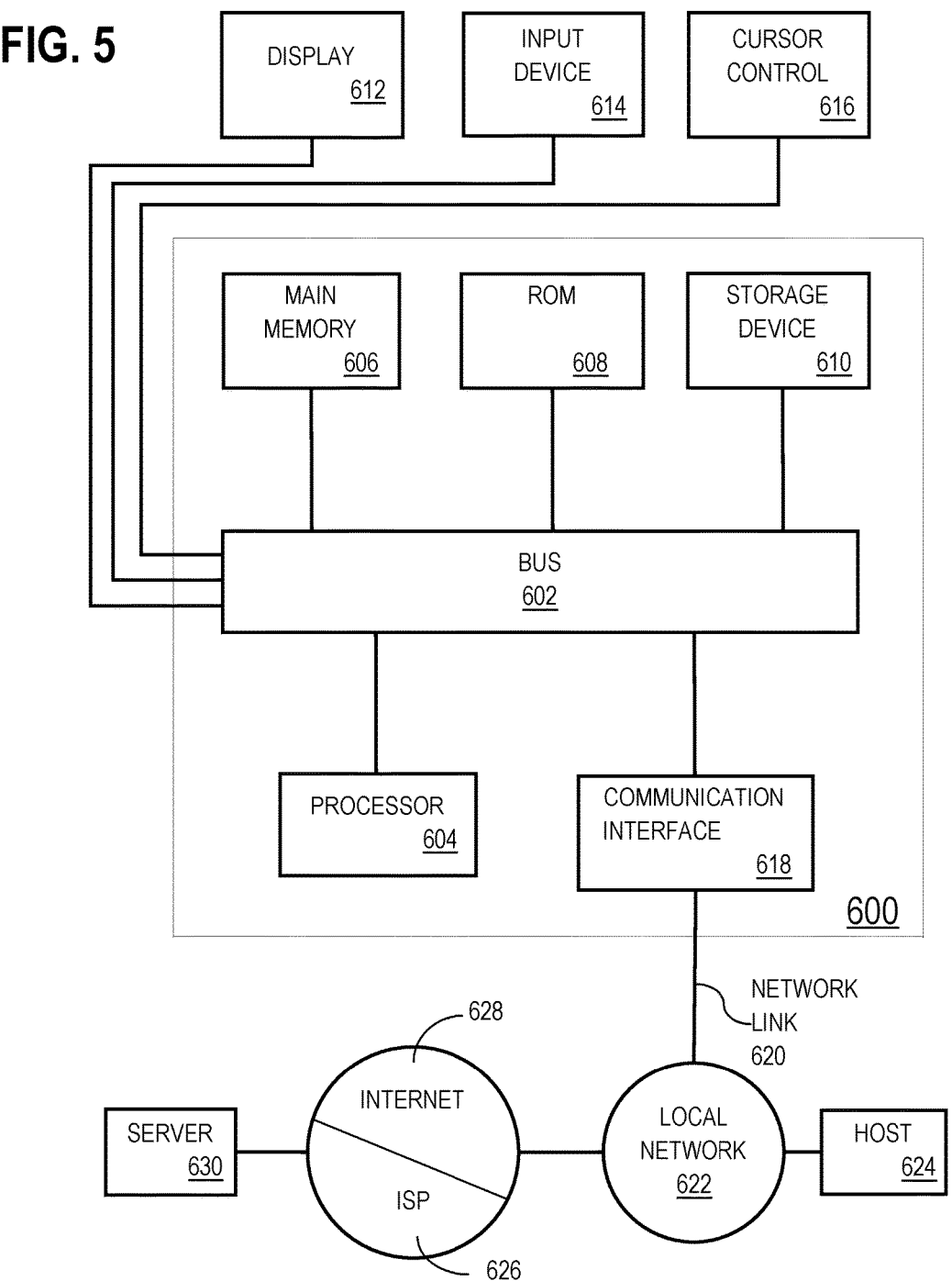

ENABLING MULTI-TENANT ACCESS TO RESPECTIVE ISOLATED DATA SETS ORGANIZED USING DIFFERENT APPLICATION SCHEMAS

INCORPORATION BY REFERENCE; RELATED APPLICATIONS

This application is related to U.S. Non-Provisional patent application Ser. No. 14/973,325, filed Dec. 17, 2015, which is hereby incorporated by reference.

This application is also related to U.S. patent application Ser. No. 13/631,815, filed Sep. 28, 2012, now published as U.S. Patent Application Publication No. 2014/0095530, published Apr. 3, 2014, which claims priority to U.S. Provisional Patent Application No. 61/707,726, filed Sep. 28, 2012; and U.S. Provisional Patent Application No. 61/707,726, filed Sep. 28, 2012; all of which are hereby incorporated by reference.

TECHNICAL FIELD

The present disclosure relates to multi-tenant, cloud-based hardware and/or software services. In particular, the present disclosure relates to enabling multi-tenant access to respective isolated data sets organized using different application schemas.

BACKGROUND

In a multi-tenant, cloud-based environment, multiple tenants use one or more applications executing on shared computing resources. The shared computing resources may be located in data centers off the tenant's own premises (referred to herein as an "off-premise environment").

In some cloud-based environments, a separate instance of a server is created for each tenant, either physically or via virtualization. Each instance of a server implements separate application code and application schema for each tenant.

In other cloud-based environments, a shared instance of a server is created for multiple tenants. The shared instance of the server implements the same application code for multiple tenants. The shared instance of the server also implements a common application schema for the tenants. Data sets for the multiple tenants are organized using the common application schema and indexed by tenant identifier (ID).

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 4B illustrates an example of different application schemas in accordance with one or more embodiments; and FIG. 5 shows a block diagram that illustrates a computer system in accordance with one or more embodiments.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. MULTI-DATASTORE ARCHITECTURE
   a. DATABASE INSTANCE
   b. PLUGGABLE DATABASE
   c. DATABASE STRUCTURE WITHIN DATABASE INSTANCE
3. ENABLING MULTI-TENANT ACCESS TO RESPECTIVE ISOLATED DATA SETS ORGANIZED USING DIFFERENT APPLICATION SCHEMAS
4. UPDATING A BASE SCHEMA AND CUSTOMIZING AN APPLICATION SCHEMA
5. EXAMPLE EMBODIMENTS
6. CLOUD ENVIRONMENTS
7. MISCELLANEOUS; EXTENSIONS
8. HARDWARE OVERVIEW

1. General Overview

One or more embodiments include a same application code providing multiple tenants access to different datastores. At least two of the datastores are organized using different respective application schemas. The different application schemas are derived from a same base schema that is associated with the application code. The base schema indicates the names of data fields, the number of data fields, the number of tables, and other aspects of a default datastore that is used by the particular application. The application schema is a modified and/or customized version of the base schema. The application schema may modify the names of data fields, the number of data fields, the number of tables, and other aspects of the base schema. A modification of an application schema associated with a datastore corresponding to a particular tenant does not affect the application schemas associated with datastores corresponding to other tenants. Each application schema may have, for example, a different number of data fields. Meanwhile, a modification of the base schema is applied across various application schemas associated with datastores corresponding to various tenants.

2. Multi-Datastore Architecture

Figure 1A:
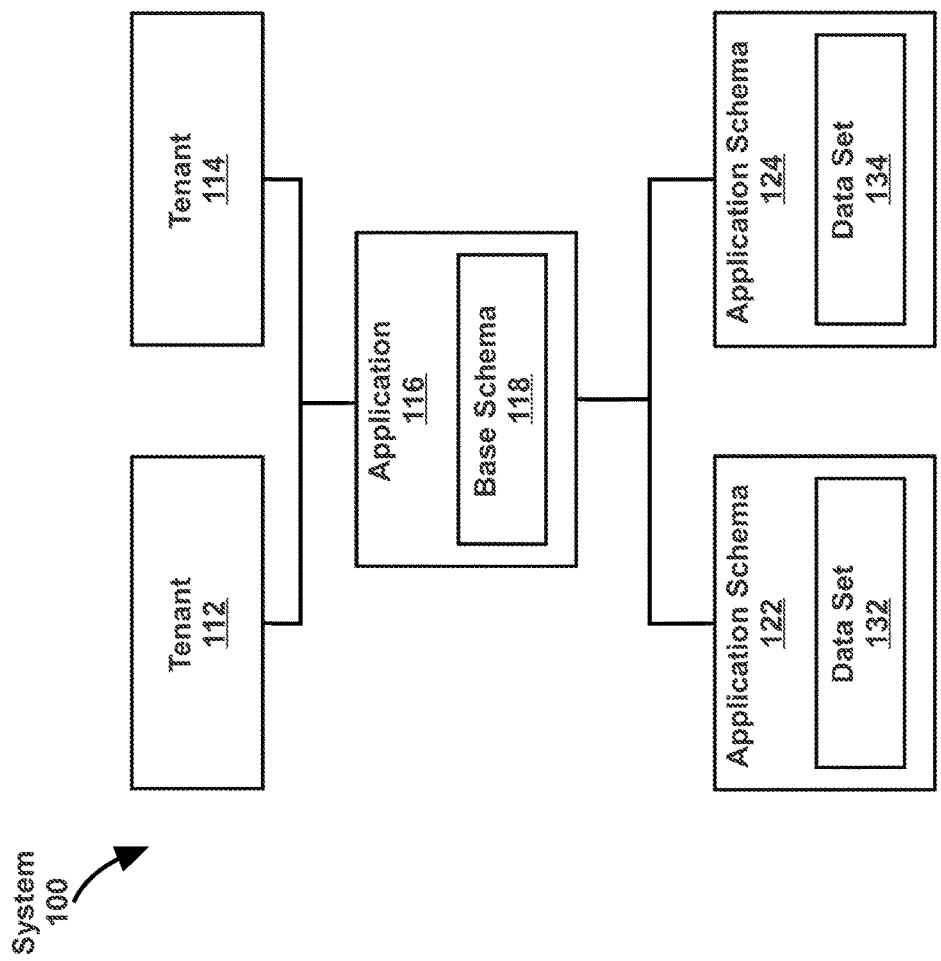
FIG. 1A illustrates a multi-datastore architecture, in accordance with one or more embodiments.

FIG. 1A illustrates a multi-datastore architecture in accordance with one or more embodiments. The multi-datastore architecture (including modifications thereof) may be used in serving data from multiple datastores. The multi-datastore architecture is illustrated in FIG. 1A as a system of components, referred to as system 100.

As illustrated in FIG. 1A, system 100 includes tenants 112-114, application 116, base schema 118, application schemas 122-124, and data sets 132-134. In one or more embodiments, system 100 may include more or fewer components than the components illustrated in FIG. 1A. The components illustrated in FIG. 1A may be local to or remote from each other. The components illustrated in FIG. 1A may be implemented in software and/or hardware and may be distributed over one or more applications and/or machines. Operations described with respect to one component may instead be performed by another component.

In one or more embodiments, a tenant (such as tenant 112 and/or tenant 114) is a corporation, organization, enterprise or other entity that accesses a shared computing resource, such as application 116. In an embodiment, tenant 112 and tenant 114 are independent from each other. A business or operation of tenant 112 is separate from a business or operation of tenant 114. As described below, data and operations associated with different tenants may be isolated from one another.

In an embodiment, system 100 is implemented using devices that are remote from the premises of tenant 112 and tenant 114. Devices executing application 116, a datastore having application schema 112, and/or a datastore having application schema 124 are remote from tenant 112 and tenant 114. The devices are accessed via a public network, such as the Internet, using a communications protocol, such as Hypertext Transfer Protocol (HTTP). As an example, system 100 may include one or more data centers that are located remote to corporate offices.

In an embodiment, system 100 is used to provide a cloud-based environment to tenant 112 and tenant 114. The cloud environment includes a centralized pool of resources that are shared amongst the multiple tenants 112-114. Examples of resources include a processor, a server, a data storage, a virtual machine, and a platform. Client devices of tenants 112-114 may independently request computing services, such as server time and network storage, as needed. The resources assigned to each particular client device may be scaled up or down based on the computing services requested by the particular client device. The resources assigned to each particular client device may also be scaled up or down based on the aggregated demand for computing services requested by all client devices.

In an embodiment, data sets stored using system 100 that correspond to different tenants are isolated from each other. As illustrated in FIG. 1A, data set 132 corresponds to tenant 112, and data set 134 corresponds to tenant 114. Tenant isolation may be achieved using, for example, tenant identifiers (IDs), application schemas 122-124, and/or tenant-specific overlay networks. Examples of operations executed within a cloud environment to manage resources and implement tenant isolation are described below in Section 5, titled "Cloud Environments."

Continuing with FIG. 1A, application 116 includes executable code and/or logic that is configured to execute operations, such as retrieving and/or accessing one or more data sets 132-134. Application 116 is a shared computing resource available to tenants 112-114. Application 116 executes on hardware (such as one or more servers and/or computers) located in an environment (such as a data center) that is remote from the premises of tenant 112 and tenant 114 (referred to herein as an "off-premise environment").

In one or more embodiments, base schema 118 indicates the names of data fields, the number of data fields, the number of tables, and other aspects of a default datastore that is used by application 116. Base schema 118 indicates the basic features and/or functions of a default datastore that is used by application 116. Base schema 118 is shared amongst tenants 112-114 and is modified and/or customized to form application schemas 122-124.

In one or more embodiments, an application schema (such as application schema 122 and/or application schema 124) indicates the names of data fields, the number of data fields, the number of tables, and other aspects of a particular datastore that is used by application 116. The particular datastore corresponds to a particular tenant (such as tenant 112 and/or tenant 114). The particular datastore may be implemented on hardware that is shared amongst tenants in an off-premise environment. Additionally or alternatively, the particular datastore may be implemented on hardware that is located at the premises of the particular tenant (referred to herein as an "on-premise environment"). Differences between base schemas and application schemas are further detailed below.

In an embodiment, each data field is associated with a name and a data field identifier (ID). A name of a data field, as referred to herein, is a set of words, text, and/or characters, that is displayed at a user interface to reference the data field. As an example, a particular data field may be named, "Date." A user interface may display a textbox for inputting a value into the particular data field. The user interface may display the name "Date" adjacent to the textbox, to indicate which data field is being modified by user input entered into the textbox. An identifier of a data field, as referred to herein, is a set of words, text, and/or characters, that is used by executable code and/or logic of application 116 to reference the data field. As an example, a particular data field may have the identifier, "1234." An application may perform certain operations on the particular data field. The application may reference the particular data field by using the identifier, "1234." Each application schema may have different sets of data fields. A particular application schema may have a data field that overlaps with a data field of another application schema. A particular application schema may have a data field that is unique to the particular application schema and not included in other application schemas derived from a same base schema. Examples of overlapping data fields and unique fields are described in the examples below.

As an example, a data field of application schema 122 and another data field of application schema 124 may have a same data field ID but may be referenced by different names. The data field of application schema 122 and the data field of application schema 124, having the same data field ID, may be an overlapping data field of application schema 122 and application schema 124. The same data field ID would indicate that the same operations may be performed, by an application 116, on the data field of application schema 122 and the data field of application schema 124. However, the data fields may be referred to using different names. The different names may be, for example, "First Name" and "Given Name," both referring to a name of an individual.

As another example, a data field with a particular data field ID may exist in application schema 122 but not in application schema 124. The data field with the particular data field ID may be a unique data field to application schema 122. The data field may have been added in application schema 122 through customization of application schema 122. But the data field was not added in application schema 124.

In an embodiment, application schemas 122-124 are derived from base schema 118. A first set of modifications are made to base schema 118 to form application schema 122, and a second (different) set of modifications are made to base schema 118 to form application schema 124. The first set of modifications may include, for example, modifying a name of a data field already existing in base schema 118. The second set of modifications may include, for example, adding a data field for storing data that is applicable to tenant 114 but not to tenant 112. Hence, application schema 122 and application schema 124 indicate different names of data fields, different numbers of data fields, different numbers of tables, and/or other differences.

As an example, a base schema may be associated with storing data sets related to vehicles. A first application schema may be associated with pickup trucks. A data field that is applicable to pickup trucks and not already existing in the base schema may be a size of the truck bed. A data field for the size of the truck bed may be added to the base schema to form the first application schema. Meanwhile, a second application schema may be associated with sedans. The size of the truck bed may not be applicable to sedans. Therefore the data field for the size of the truck bed is not included in the second application schema.

In an embodiment, application schemas 122-124 are used to organize data sets (such as data sets 132-134) that are to be accessed by a same application 116 that is associated with base schema 118. As an example, a particular application may be associated with a base schema. The base schema may be associated with storing data sets related to vehicles. A first application schema, derived from the base schema, may be associated with pickup trucks. A second application schema, derived from the base schema, may be associated with sedans. The particular application may be used to access a first data set organized using the first application schema. The particular application may also be used to access a second data set organized using the second application schema.

In an embodiment, application schemas 122-124 correspond to different datastores. A datastore includes one or more data structures for organizing one or more data sets (such as data set 132 and/or data set 134) using an application schema (such as application schema 122 and/or application schema 124). Examples of data structures include a table, an array, a linked list, a tree, and a container (which is a collection of data structures). The organization of a datastore enables the contents of the datastore to be accessed, managed, and/or updated by a computer.

In an embodiment, various implementations of datastores may be used. Examples of datastores include a database instance, a pluggable database, and a data structure within a database instance, each of which is further described below.

A. Database Instance

In an embodiment, application schemas 122-124 correspond to different database instances. A database instance is a physical database and includes a set of memory structures and background processes for organizing a data set.

In an embodiment, memory structures of a datastore include a buffer cache, a redo log, and/or a shared pool. A buffer cache stores copies of data blocks currently or recently read from the data set. On a subsequent access request, the cached data blocks may be retrieved from the buffer cache rather than the data set.

A redo log stores redo entries, which describe current or recent changes made to the data set. In case of failure with the database instance and/or the data set, the redo log may be used to restore the most current version of the data set.

A shared pool stores copies of various current or recent program data. The shared pool stores parsed code (such as commands in Structured Query Language (SQL) or Java) for accessing the data set. On subsequent calls to the same code, the parsed code may be re-executed from the shared pool. Additionally or alternatively, the shared pool stores results returned from a query and/or a function. Results include, for example, a subset of a data set that matches criteria of a particular query.

In an embodiment, background processes of a datastore include a background monitoring process, a listener registration process, and a database writer process. A background monitoring process is configured to monitor the database instance and perform process recovery in case a process fails. Process recovery includes freeing up resources that were being used by the failed process, such as releasing database locks. The background monitoring process executes periodically, for example, every 3 seconds.

A listener registration process is configured to register a database instance with a listener. The listener is a server-side process that listens for incoming client connection requests and manages client traffic to the data set. The listener registration process provides the listener with the name and/or identifier of the database instance, and the addresses of service handlers of the database instance. A service handler is a process that serves as a connection point to a data set. The registration information enables the listener to select an appropriate service handler when a client request arrives and forward the client request to the selected service handler.

A database writer process is configured to write contents of a buffer cache to the data set, which may be stored on disk. The database writer process executes periodically and/or on an on-demand basis (such as, when no clean buffer caches are available).

B. Pluggable Database

In an embodiment, application schemas 122-124 correspond to different pluggable databases that execute under one instance, or copy, of a container database. The container database holds the functionality and metadata that applies to all pluggable databases included therein. Each pluggable database includes a separate schema for the corresponding pluggable database. Examples of pluggable databases are described in U.S. patent application Ser. No. 13/631,815, filed Sep. 28, 2012, now published as U.S. Patent Application Publication No. 2014/0095530, published Apr. 3, 2014, which claims priority to U.S. Provisional Patent Application No. 61/707,726, filed Sep. 28, 2012; and U.S. Provisional Patent Application No. 61/707,726, filed Sep. 28, 2012; which are hereby incorporated by reference.

Figure 1B:
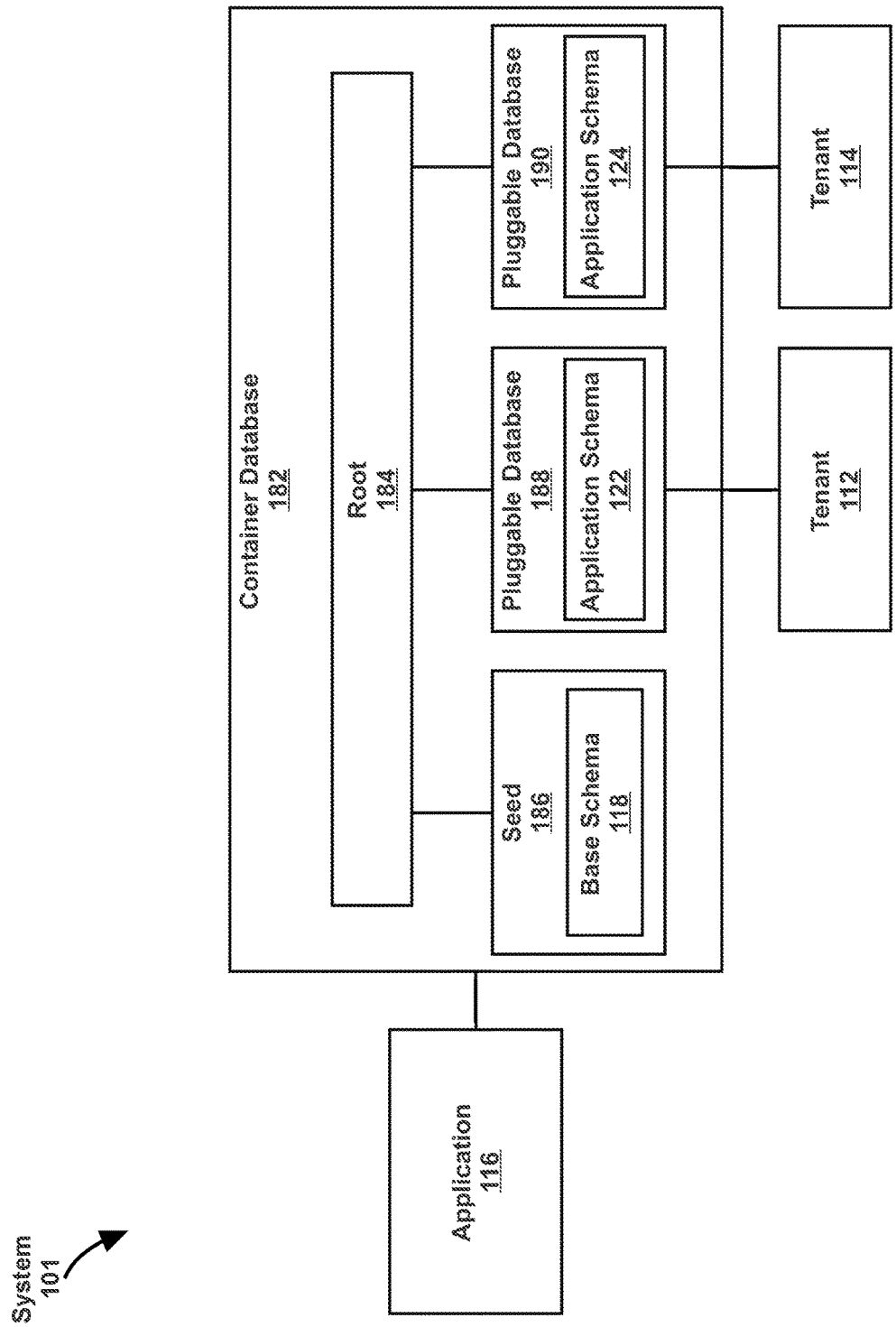
FIG. 1B illustrates an example of multiple pluggable databases executing under one instance of a container database, in accordance with one or more embodiments.

FIG. 1B illustrates an example of multiple pluggable databases executing under one instance of a container database, in accordance with one or more embodiments. As illustrated in FIG. 1B, system 101 includes tenants 112-114, an application 116, and container database 182. Container database 182 includes root 184, seed 186, pluggable database 188, and pluggable database 190. In one or more embodiments, system 101 may include more or fewer components than the components illustrated in FIG. 1B. The components illustrated in FIG. 1B may be local to or remote from each other. The components illustrated in FIG. 1B may be implemented in software and/or hardware and may be distributed over one or more applications and/or machines.

Operations described with respect to one component may instead be performed by another component.

In an embodiment, system 101 operates in an off-premise environment (such as off-premise environment 104 in FIG. 1A). Application 116 is a shared computing resource of tenants 112-114. Application 116 accesses container database 182 to access data sets, of tenant 112 and/or tenant 114, stored at pluggable database 188 and/or pluggable database 190.

In an embodiment, container database 182 includes metadata that is used for organizing data sets across pluggable database 188 and pluggable database 190. The metadata is stored at root 184 and/or seed 186. Container database 182 further includes none, one, or more pluggable databases.

In an embodiment, container database 182 is implemented as a database instance. Container database 182 includes a set of memory structures (such as a buffer cache, redo log, and shared pool) and background processes (such as a background monitoring process, a listener registration process, and a database writer process).

In an embodiment, root 184 stores one or more code packages (such as SQL packages, or Procedural Language Extensions to SQL (PL/SQL) packages) common to accessing pluggable database 188 and pluggable database 190. A code package serves as an interface between application 116 and pluggable databases 188-190. The code package declares the types, variables, constants, exceptions, cursors, and subprograms available for use by application 116. Root 184 also stores common users, which are users that may access container database 182 and all pluggable databases 188-190 of container database 182.

In an embodiment, seed 186 is a template that container database 182 uses to generate new pluggable databases 188-190. Tenants 112-114 may not modify seed 186. In an embodiment, seed 186 includes base schema 118 as the template. As described above, base schema 118 indicates the names of data fields, the number of data fields, the number of tables, and other aspects of a default datastore that is used by application 116. Alternatively (not shown), seed 186 includes a template that has less data fields than base schema 118. Base schema 118 is derived from seed 186 and used in a pluggable database (such as pluggable database 188 and/or pluggable database 190).

In an embodiment, a pluggable database (such as pluggable database 188 and/or pluggable database 190) includes specific features for organizing a data set of a tenant (such as tenant 112 and/or tenant 114). Pluggable database 188 stores a data set of tenant 112, and pluggable database 190 stores a data set of tenant 114. Each pluggable database is derived from seed 186 (or another pluggable database) and modifiable by a tenant. In an embodiment, application schema 122 is used in pluggable database 188, and application schema 124 is used in pluggable database 190. Each of applicable schema 122 and application schema 124 is derived from base schema 118.

In an embodiment, each pluggable database relies on the set of memory structures (such as a buffer cache, redo log, and shared pool) of container database 182. Each pluggable database relies on the background processes (such as a background monitoring process, a listener registration process, and a database writer process) of container database 182. Each pluggable database does not have a separate set of memory structures and/or background processes performing the functions of container database 182.

C. Data Structure Within Database Instance

In an embodiment, application schemas 122-124 correspond to separate data structures within a same database instance. As described above, a database instance is a physical database, requiring certain memory structures and background processes. Meanwhile, the separate data structures may not necessarily have individual respective memory structures and background processes. As an example, the separate data structures may rely on and share the background monitoring process of the database instance. As another example, the separate data structures may rely on and share the buffer cache of the database instance. The database instance is a datastore of the data structures contained therein. Each data structure is a datastore of a collection of data corresponding to a tenant.

In an embodiment, the separate data structures within a same database instance may be associated with different characteristics. As an example, separate data structures within a same database instance may be separate tables within a same database instance. As an example, the separate data structures may be of different types (such as a relational database, or an object-oriented database). As an example, the separate data structures may be accessed via different processes. A first set of processes, responding to requests received at a first port of a server, may be used to access a first data structure. A second set of processes, responding to requests received at a second port of a server, may be used to access a second data structure. As an example, the separate data structures may be set with different configurations. One example configuration is a caching policy, including for example the size of the cache, and triggers for caching. Another example configuration is an isolation level, which defines how and when changes to a data set made by one operation become visible to other operations. Another example configuration is a logging level, specifying the events (such as warnings, errors, and critical errors) that are to be logged.

Figure 2:
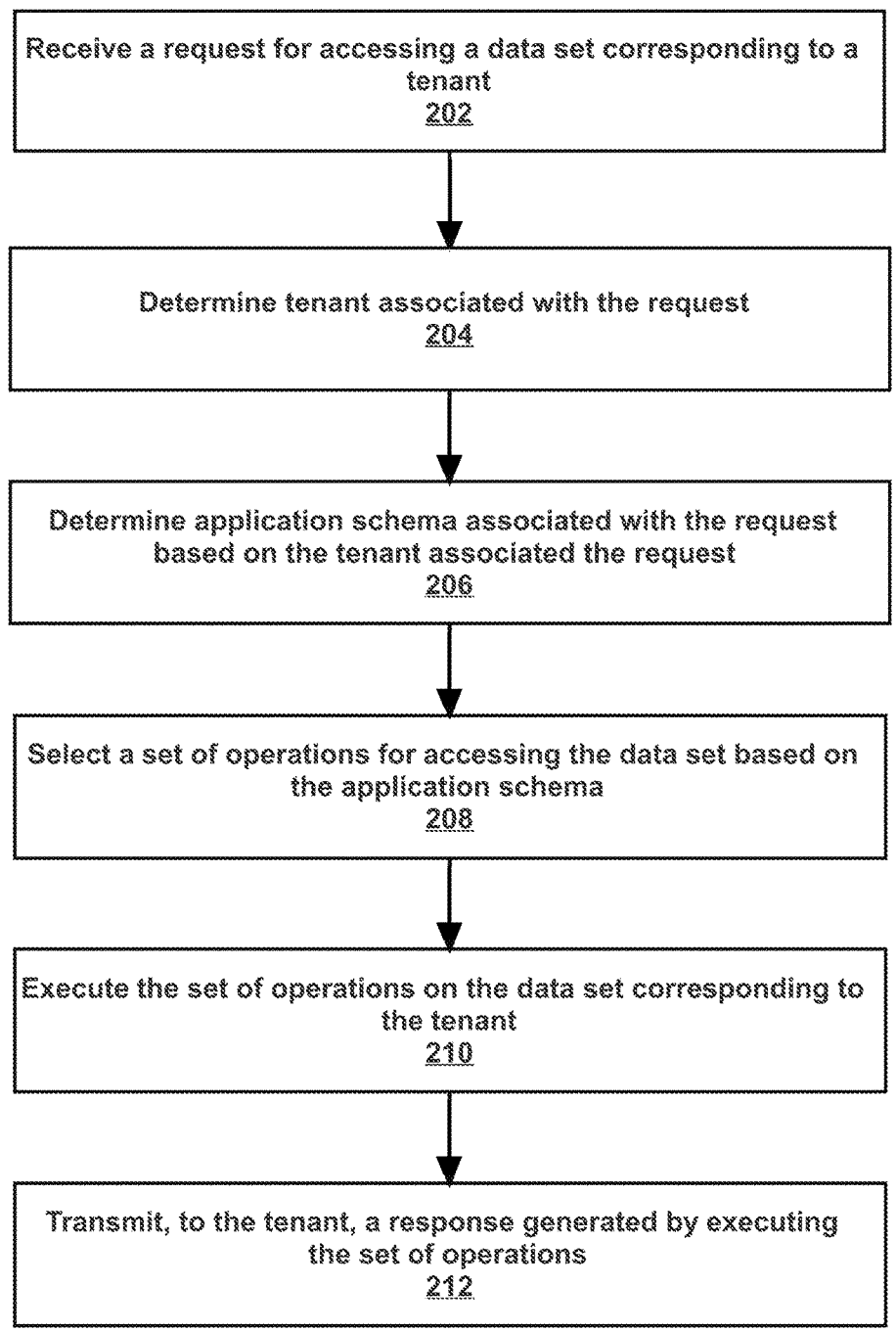
FIG. 2 illustrates an example set of operations for enabling multi-tenant access to respective isolated data sets organized using different application schemas, in accordance with one or more embodiments.

3. Enabling Multi-Tenant Access to Respective Isolated Data Sets Organized Using Different Application Schemas FIG. 2 illustrates an example set of operations for enabling multi-tenant access to respective isolated data sets organized using different application schemas, in accordance with one or more embodiments. One or more operations illustrated in FIG. 2 may be modified, rearranged, or omitted all together. Accordingly, the particular sequence of operations illustrated in FIG. 2 should not be construed as limiting the scope of one or more embodiments.

One or more embodiments include receiving a request, from a tenant of a set of tenants, for accessing a data set corresponding to the tenant (Operation 202). The data set is one of a group of data sets corresponding respectively to multiple tenants. Each data set is organized using a different application schema derived from a base schema. A set of user interface elements is rendered for each tenant by a same application. The request from the tenant is received through the corresponding set of user interface elements rendered for the tenant. As an example, a request may be received via the Internet using HTTP.

In an embodiment, requests received from different tenants (during the same time period or during different time periods) are substantially similar. As an example, each request may seek to access the first and last names of the employees of the corresponding tenant. Each request may include a same command and a set of parameters referring to the "first name" and "last name" of the corresponding datastore.

As another example, each request may seek to access data fields, having a same data field ID, of different data sets. However, while the data fields may have a same data field ID, the data fields may be referenced using different names in different data sets. The requests would be substantially similar to each other.

As another example, each request, received from different tenants, may be received through a same set of user interactions with a same set of user interface elements (such as clicking a same "Submit" button on a same page, each page being rendered at different browsers for different tenants). The same set of user interface elements may have different configurations, based on customizations made by each tenant. For example, a particular user interface element rendered for a first tenant may be labeled with the text "Department," while the particular user interface element rendered for a second tenant may be labeled with the text "Office." "Department" and "Office" may be different names referring to a same data field used by the first tenant and the second tenant.

As noted above, each data set is organized using a different application schema derived from a base schema. After a tenant subscribes to an application, the base schema associated with the application is copied as an application schema for a datastore of the tenant. The tenant may optionally modify and/or customize the application schema. For example, the tenant may change the name of data fields and/or add new data fields. Each tenant may make different modifications, thereby resulting in different application schemas for different tenants.

One or more embodiments include determining a tenant associated with a request (Operation 204). Each request includes a user identifier (ID) of a user account that is being used to initiate the request. The user ID may correspond to a human user's ID or a machine ID (e.g., a Media Access Control address or an Internet Protocol address). The user ID may correspond to a session ID associated with a user's current session. The user ID is mapped to a corresponding tenant ID. The tenant is determined based on the tenant ID.

As an example, a request may be received from a user account having a user ID, "peter_brown." A look-up table may map the user ID, "peter_brown," to a tenant ID, "Company_xyz." The tenant associated with the request would be determined to be "Company_xyz."

One or more embodiments include determining an application schema associated with the request based on the tenant associated with the request (Operation 206). Determining the application schema based on the tenant may include executing a query based on a tenant identifier to obtain an application schema corresponding to the tenant. Metadata, a database, a table, or other memory may be used to store a mapping between tenant identifiers and corresponding application schemas. Additionally or alternatively, determining the application schema based on the tenant may include identifying a data set associated with the tenant. After identifying the data set associated with the tenant, the application schema associated with the data set is determined.

In an embodiment, metadata describing application schemas corresponding to each tenant is maintained as the application schemas are modified and/or customized by the tenants. The metadata describes the names of data fields, the number of data fields, the number of tables, and other aspects of the datastore of each tenant. The metadata is stored as part of the shared application accessed by the multiple tenants and/or on another shared computing resource used by the tenants.

In an embodiment, the metadata includes a mapping of tenant IDs to the corresponding customizations made by each tenant. A look-up of the metadata using a tenant ID associated with a particular request indicates the application schema associated with the particular request.

One or more embodiments include selecting a set of operations for accessing the data set based on the application schema (Operation 208). Selecting the set of operations may include, for example, selecting commands and/or data fields for execution of the commands. In an embodiment, sets of operations corresponding to different applications schemas include different sets of commands and/or different sets of data fields (referred to as parameters) upon which the commands are to be executed. As an example, two sets of operations corresponding to two different application schemas include (a) a same set of commands and (b) different data fields.

As an example, a first application schema associated with a first request may have three data fields, with the following data field IDs and data field names:
Data Field ID #1: "Sale Date";
Data Field ID #2: "Quantity"; and
Data Field ID #3: "Price Per Unit."

A second application schema associated with a second request may have four data fields, with the following data field IDs and data field names:
Data Field ID #1: "Date of Sale";
Data Field ID #2: "Quantity";
Data Field ID #3: "Price Per Unit"; and
Data Field ID #4: "Profit Per Unit."

A first request from a first tenant and a second request from a second tenant may both request the sales information from the past quarter from a same application. The first request may seek the sales information of the first tenant. The second request may seek the sales information of the second tenant.

A method for accessing the sales information may execute various operations, including an operation for retrieving/displaying the sales information on a page of a browser. The method may indicate that the number of parameters to be input into the retrieving/displaying operation is the same as the number of sales-related data fields of the corresponding application schema.

For the first request, the retrieving/displaying operation would include three parameters, Data Field ID #1, Data Field ID #2, and Data Field ID #3. The operation would return the "Sales Date," "Quantity," and "Price Per Unit" information for the past quarter.

For the second request, the retrieving/displaying operation would include four parameters, Data Field ID #1, Data Field ID #2, Data Field ID #3, and Data Field #4. The operation would return the "Date of Sale," "Quantity," "Price Per Unit," and "Profit Per Unit" information for the past quarter.

In an embodiment, different sets of operations, within a same method, are to be performed for different application schemas. The operations are selected based on a look-up table and/or logic statements. Additionally or alternatively, different methods are defined for different application schemas.

As an example, an application may provide a method for printing sales information. If the number of data fields is five or less, then the sales information is to be printed on one piece of paper. If the number of data fields is between six and ten, then the sales information is to be printed on two pieces of paper.

The method may include an if statement, inquiring whether the number of data fields is five or less. If so, then a first set of operations that lays out the sales information onto one page are to be executed. The method may include another if statement, inquiring whether the number of data fields is between six and ten. If so, then a second set of operations that lays out the sales information onto two pages are to be executed.

As another example, an application may include a table indicating which methods correspond to which application schemas. Different methods may correspond to a same request, as received by the application. A first method, including a first set of operations, is to be called if a first application schema is being used. A second method, including a second set of operations, is to be called if a second application schema is being used.

One or more embodiments include executing the set of operations, associated with the request, to access the data set corresponding to the tenant associated with the request (Operation 210). The data set corresponding to a particular tenant is identified using a tenant ID and/or an application schema. The set of operations are executed with respect to the data set corresponding to the particular tenant.

In an embodiment, data sets are stored in pluggable databases. Each pluggable database is associated with a tenant ID. A request is made by a particular tenant with tenant ID #xyz. Using tenant ID #xyz, the request may cause access to only the pluggable database associated with tenant ID #xyz. Hence, only data sets corresponding to the particular tenant may be accessed by the particular tenant.

In an embodiment, data sets are stored in different data structures within a same database instance. Each data structure is associated with a tenant ID. A request is made by a particular tenant with tenant ID #xyz. Using tenant ID #xyz, the request may cause access to only the data structure associated with tenant ID #xyz. Hence, only data sets corresponding to the particular tenant may be accessed by the particular tenant.

In an embodiment, data sets are accessed using applications schemas. Each application schema is associated with a different tenant ID. A request is made by a particular tenant with tenant ID #xyz. Metadata indicates that tenant ID #xyz is associated with a particular application schema. Using the particular application schema, the request may cause access to only the data set organized using the particular application schema. Hence, only data sets corresponding to the particular tenant may be accessed by the particular tenant.

One or more embodiments include transmitting a response generated by executing the set of operations to the tenant (Operation 212). A response to a request of a particular tenant is transmitted to the particular tenant. Each response is transmitted using a same application. As an example, each response may be presented using a same set of user interface elements. The same set of user interface elements may be rendered by a same application at different browsers for different tenants. The same set of user interface elements may be used to present different data sets for each response. As an example, a response may be transmitted via the Internet using HTTP.

4. Updating a Base Schema and Customizing an Application Schema

Figure 3A:
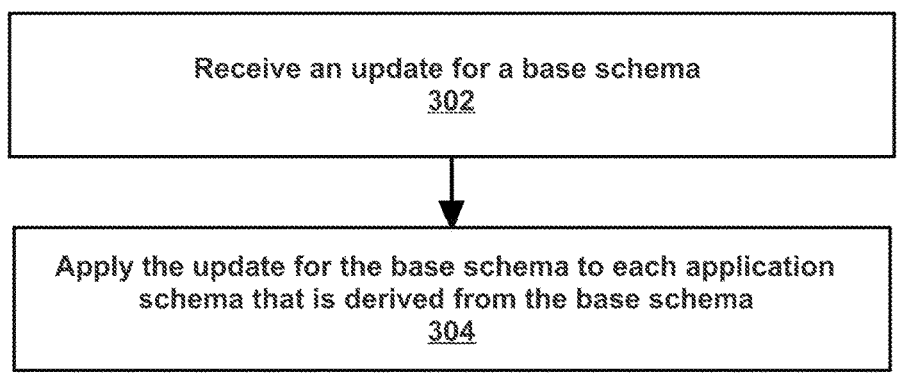
FIGS. 3A and 3B illustrate example sets of operations for updating a base schema and customizing an application schema, in accordance with one or more embodiments.

FIG. 3A illustrates an example set of operations for updating a base schema, in accordance with one or more embodiments. One or more operations illustrated in FIG. 3A may be modified, rearranged, or omitted all together. Accordingly, the particular sequence of operations illustrated in FIG. 3A should not be construed as limiting the scope of one or more embodiments.

One or more embodiments include receiving an update for a base schema (Operation 302). The update is received from an entity that created and/or manages a particular application associated with the base schema (such as an application vendor). As an example, the update may be received via the Internet using HTTP.

One or more embodiments include applying the update for the base schema to each application schema that is derived from the base schema (Operation 304). Each application schema is modified to incorporate the update.

As an example, a particular base schema may include two data fields, "First Name" and "Last Name." A first application schema and a second application schema may both be derived from a particular base schema. The first application schema may have added a data field named "Residential Address." The second application schema may have added a data field named "Office Address." An update for the particular base schema may be to add another data field named "Age." The update may be applied to the first application schema and the second application schema. The first application schema would then include the data fields, "First Name," "Last Name," "Age," and "Residential Address." The second application schema would then include the data fields, "First Name," "Last Name," "Age," and "Office Address."

Figure 3B:
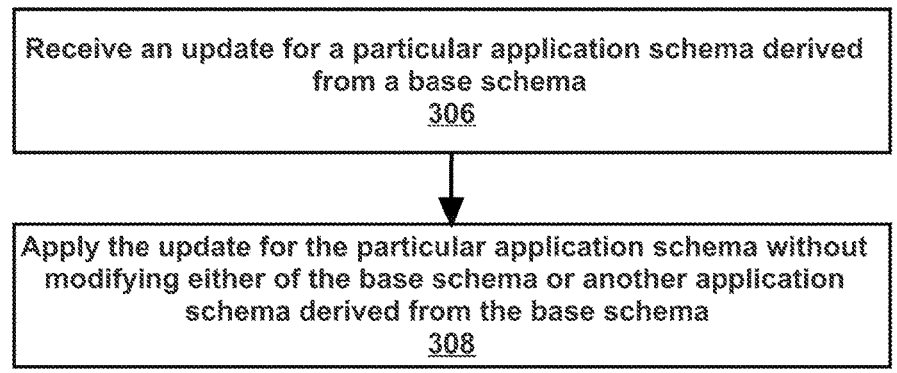

FIG. 3B illustrates an example set of operations for customizing an application schema, in accordance with one or more embodiments. One or more operations illustrated in FIG. 3B may be modified, rearranged, or omitted all together. Accordingly, the particular sequence of operations illustrated in FIG. 3B should not be construed as limiting the scope of one or more embodiments.

One or more embodiments include receiving an update for a particular application schema derived from a base schema (Operation 306). The update is received from a tenant associated with the particular application schema. As an example, the update may be received via the Internet using HTTP.

One or more embodiments include applying the update to the particular application schema, without modifying either the base schema or another application schema that is derived from the base schema (Operation 308). While the particular application schema is modified to incorporate the update, the base schema and other application schemas are not modified.

As an example, a particular base schema may include two data fields, "First Name" and "Last Name." A first application schema and a second application schema may both be derived from a particular base schema. The first application schema may have added a data field named "Age." Subsequently, an update for the first application schema may be to add another data field named "Residential Address." The update may be applied to the first application schema, without modifying the particular base schema or the second application schema. The first application schema would then include the data fields, "First Name," "Last Name," "Age," and "Residential Address." The base schema would remain unmodified, including the data fields, "First Name" and "Last Name." The second application schema would also remain unmodified.

In an embodiment, the update for the particular application schema is described in metadata. The metadata is stored in association with an application that is used to access a data set organized using the particular application schema. When the application receives a request from a tenant to access the data set, the particular application schema corresponding to the tenant is identified using the metadata.

5. Example Embodiments

Detailed examples are described below for purposes of clarity. Components and/or operations described below should be understood as specific examples which may not be applicable to certain embodiments. Accordingly, components and/or operations described below should not be construed as limiting the scope of any of the claims.

Figure 4A:
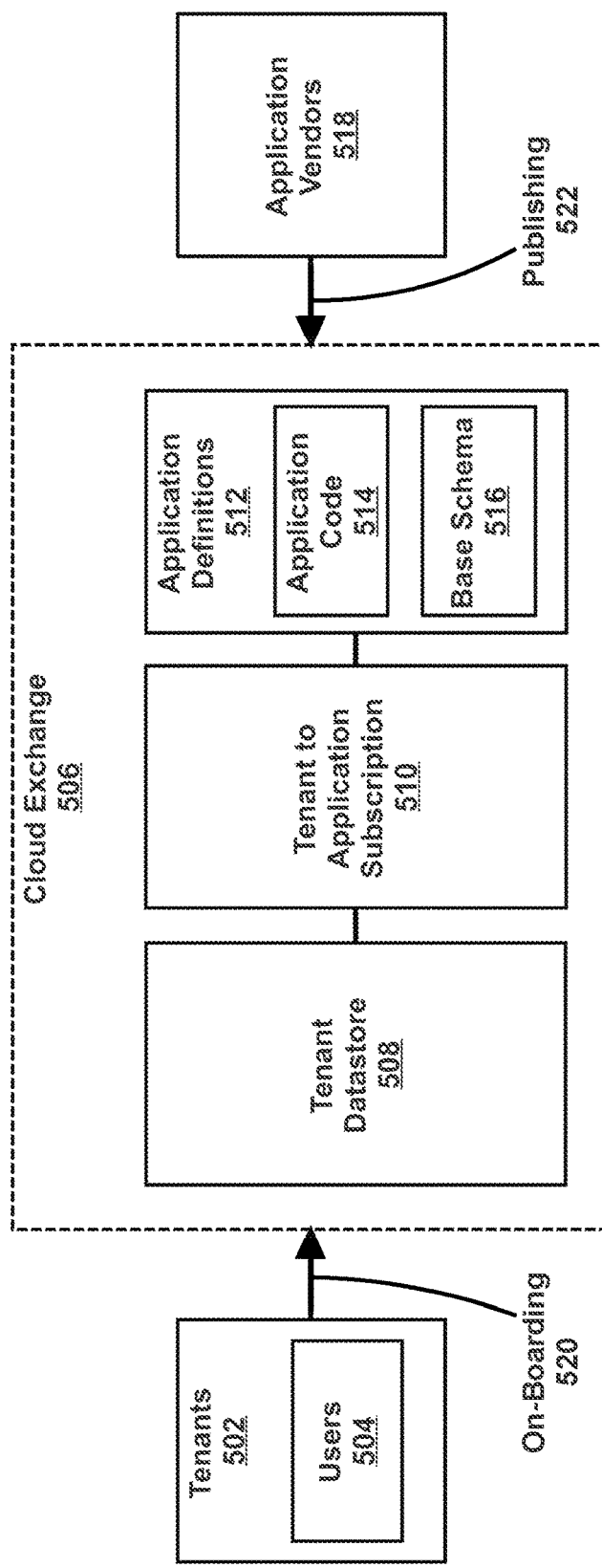
FIG. 4A illustrates an example of accessing isolated data sets using a same application in accordance with one or more embodiments.

FIG. 4A illustrates an example of accessing isolated data sets using a same application in accordance with one or more embodiments. FIG. 4A shows tenants 502, cloud exchange 506, and application vendors 518.

Tenants 502 share computing resources provided by cloud exchange 506. Tenants 502 gain access to cloud exchange 506 through an on-boarding process 520. Through the on-boarding process 520, a tenant datastore 508 is assigned to each tenant. Users 504 corresponding to each tenant are also specified.

Each tenant datastore 508 is isolated per tenant. Each tenant datastore is associated with a tenant. As an example, each tenant datastore may be implemented in a separate pluggable database. As another example, each tenant datastore may be implemented in a separate data structure within a same database instance.

Application vendors 518 provide application definitions 512, which are maintained on the shared computing resources of cloud exchange 506, through a publishing process 522. Each application definition includes application code 514 and base schema 516. Application code 514 is configured to execute requests received from tenants 502 (such as accessing tenant datastore 508 of a particular tenant). The same application code 514 is executed for multiple tenants 502. Base schema 516 indicates data fields and other characteristics of a default datastore for the corresponding application definition.

Tenants to application subscription 510 includes a list of subscribed applications for each tenant. Subscription to a particular application gives a tenant access to the particular application. When a particular tenant subscribes to a particular application, base schema 516 of the particular application is copied as an application schema for a tenant datastore 508 of the particular tenant. The particular tenant may make customizations to the application schema for the tenant datastore 508, such as modifying names of existing data fields and/or adding new data fields.

FIG. 4B illustrates an example of different application schemas in accordance with one or more embodiments. FIG. 4B shows page 550 and page 560, both associated with a same application. Page 550 is rendered at a browser for a first tenant, HomeImprove Corp. Page 560 is rendered at a browser for a second tenant, Larry Properties Inc.

Page 550 and page 560 displays a same set of user interface elements, but the user interface elements have different configurations. Page 550 displays a heading 552, data set 554, fields 556, and button 558. Page 560 displays a heading 562, data set 564, fields 566, and button 568.

A base schema for the application used by HomeImprove Corp. and Larry Properties Inc. includes three data fields. A first data field is named "Department." A second data field is named "Supervisor." A third data field is named "Location." A first application schema derived from the base schema is associated with HomeImprove Corp. A second application schema derived from the base schema is associated with Larry Properties Inc.

The number of data fields in each application schema is customized. HomeImprove Corp. specifies that an additional data field is to be added. Hence, data set 554 of HomeImprove Corp. includes four data fields. Meanwhile, Larry Properties Inc. does not specify any additional data fields. Hence, data set 564 of Larry Properties Inc. includes three data fields.

The names of data fields in each application schema are customized. HomeImprove Corp. modifies the name "Supervisor" into "Manager." HomeImprove Corp. further specifies that the name of the newly added data field is "Type." Meanwhile, Larry Properties Inc. modifies the name "Department" into "Office," and modifies the name "Location" into "Building."

Data sets 554-556 are organized according to the corresponding application schemas. Based on the application schema of HomeImprove Corp., data set 554 is organized using data fields with the names, "Department," "Manager," "Location," and "Type." Based on the application schema of Larry Properties Inc., data set 564 is organized using data fields with the names, "Office," "Supervisor," and "Building."

User interface elements for adding a new record in data sets 554-556 are modified and/or customized according to the corresponding application schemas. Based on the application schema of HomeImprove Corp., four fields 556 are used for adding a new department, labeled "Department," "Manager," "Location," and "Type," respectively. Button 558, which is used to submit user input entered at fields 556, is also customized. Button 558 displays the text, "Add Department," based on the name of the first data field being "Department." Based on the application schema of Larry Properties Inc., three fields 566 are used for adding a new department, labeled "Office," "Supervisor," and "Building," respectively. Button 568, which is used to submit user input entered at fields 566, is also customized. Button 568 displays the text, "Add Office," based on the name of the first data field being "Office."

Heading 552 and heading 562 are customized. Heading 552 displays "Your departments," based on customizations of HomeImprove Corp. Heading 562 displays "Office management section," based on customizations of Larry Properties Inc.

6. Cloud Environments

In one or more embodiments, a cloud environment provides a centralized pool of resources that are shared amongst multiple client devices. Examples of resources include a processor, a server, a data storage, a virtual machine, and a platform. Client devices may independently request computing services, such as server time and network storage, as needed. The resources are dynamically assigned to the client devices on an on-demand basis. The resources assigned to each particular client device may be scaled up or down based on the computing services requested by the particular client device. The resources assigned to each particular client device may also be scaled up or down based on the aggregated demand for computing services requested by all client devices.

In an embodiment, the resources of a cloud environment are accessible over a network, such as a private network or the Internet. One or more physical and/or virtual client devices demanding use of the resources may be local to or remote from the resources. The client devices may be any type of computing devices, such as computers or smartphones, executing any type of operating system. The client devices communicate requests to the resources using a communications protocol, such as Hypertext Transfer Protocol (HTTP). The requests are communicated to the resources through an interface, such as a client interface (such as a web browser), a program interface, or an application programming interface (API).

In an embodiment, a cloud service provider provides a cloud environment to one or more cloud users. Various service models may be implemented by the cloud environment, including but not limited to Software-as-a-Service (SaaS), Platform-as-a-Service (PaaS), and Infrastructure-as-a-Service (IaaS). In SaaS, a cloud service provider provides cloud users the capability to use the cloud service provider's applications, which are executing on the cloud resources. In PaaS, the cloud service provider provides cloud users the capability to deploy onto the cloud resources custom applications, which are created using programming languages, libraries, services, and tools supported by the cloud service provider. In IaaS, the cloud service provider provides cloud users the capability to provision processing, storage, networks, and other fundamental computing resources provided in the cloud environment. Any arbitrary applications, including an operating system, may be deployed on the cloud resources.

In an embodiment, various deployment models may be implemented by a cloud environment, including but not limited to a private cloud, a public cloud, and a hybrid cloud. In a private cloud, cloud resources are provisioned for exclusive use by a particular group of one or more entities (the term "entity" as used herein refers to a corporation, organization, person, or other entity). The cloud resources may be located on the premises of one or more entities in the particular group, and/or at one or more remote off-premise locations. In a public cloud, cloud resources are provisioned for multiple entities (also referred to herein as "tenants"). Several tenants may use a same particular resource, such as a server, at different times and/or at the same time. In a hybrid cloud, the cloud environment comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In a multi-tenant environment, where multiple tenants share a same pool of resources 112, tenant isolation is implemented. Each tenant corresponds to a unique tenant identifiers (IDs). Data sets and/or applications implemented on cloud resources that are associated with a particular tenant are tagged with the tenant ID of the particular tenant. Before access to a particular data set or application is permitted, the tenant ID is verified to determine whether the corresponding tenant has authorization to access the particular data set or application.

In an embodiment, data sets corresponding to various tenants are stored as entries in a database. Each entry is tagged with the tenant ID of the corresponding tenant. A request for access to a particular data set is tagged with the tenant ID of the tenant making the request. The tenant ID associated with the request is checked against the tenant ID associated with the database entry of the data set to be accessed. If the tenant IDs are the same, then access to the database entry is permitted.

In an embodiment, data sets corresponding to various tenants are stored in different databases or data structures. Each database or data structure is tagged with the tenant ID of the corresponding tenant. A request for access to a particular data set is tagged with the tenant ID of the tenant making the request. The tenant ID associated with the request is checked against the tenant ID associated with the database or data structure storing the data set to be accessed. If the tenant IDs are the same, then access to the database or data structure is permitted.

In an embodiment, a subscription list indicates which tenants have authorization to access which applications. For each application, a list of tenant IDs of each tenant having authorization to access the application is stored. A request for access to a particular application is tagged with the tenant ID of the tenant making the request. The tenant ID associated with the request is checked against the subscription list to determine whether the tenant is authorized to access the application. If the tenant ID associated with the request is included in the list of tenant IDs of tenants having authorization to access the application, then access to the application is permitted.

In an embodiment, data sets and virtual resources (e.g., virtual machines, application instances, and threads) corresponding to different tenants are isolated to tenant-specific overlay networks maintained by the cloud environment. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

7. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

8. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 5 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, causes performance of operations comprising:
    receiving, by an application from a first tenant, a first request for accessing a first data set stored in a first datastore organized according to a first application schema derived from a base schema;
    transmitting, by the application to the first tenant, a first response comprising at least a subset of the first data set;
    receiving, by the application from a second tenant, a second request for accessing a second data set stored in a second datastore organized according to a second application schema derived from the base schema, the second application schema being different than the first application schema;
    transmitting, by the application to the second tenant, a second response comprising at least a subset of the second data set;
    wherein the first datastore is associated with the first tenant and the second datastore is associated with the second tenant;
    wherein the first datastore and the second datastore are associated with a same physical database, and a cache of the physical database performs caching for both the first datastore and the second datastore;
    wherein at least one of the first datastore and the second datastore comprises a pluggable database;
    wherein a first update for the base schema is applied to the first application schema and is applied to the second application schema, and a second update for the first application schema is not applied to the base schema and is not applied to the second application schema.

2. The medium of claim 1, wherein the operations further comprise:
    prior to transmitting the first response: generating, by the application, the first response by executing a first set of operations that are selected based on the first application schema; and
    prior to transmitting the second response: generating, by the application, the second response by executing a second set of operations that are selected based on the second application schema, the second set of operations being different than the first set of operations.

3. The medium of claim 2, wherein the first request and the second request are substantially similar.

4. The medium of claim 1, wherein the first application schema includes references to a different number of data fields than the second application schema.

5. The medium of claim 1, wherein the first datastore is associated with a first type of data structure, and wherein the second datastore is associated with a second type of data structure different than the first type of data structure.

6. The medium of claim 1, wherein the operations further comprise:
    receiving an update for the base schema; and
    applying the update for the base schema to each of the first application schema and the second application schema.

7. The medium of claim 1, wherein the operations further comprise:
    receiving an update for the first application schema from the first tenant; and
    applying the update to the first application schema without modifying either of the second application schema or the base schema.

8. The medium of claim 1, wherein each of the first datastore and the second datastore comprises a separate pluggable database.

9. The medium of claim 1, wherein the first datastore comprises a first data structure of a particular database instance, and wherein the second datastore comprises a second data structure of the particular database instance.

10. The medium of claim 1, wherein:
    the first application schema includes references to a different number of data fields than the second application schema;
    the first datastore comprises a first data structure of a particular database instance, and the second datastore comprises a second data structure of the particular database instance;
    the operations further comprise:
        prior to transmitting the first response: generating, by the application, the first response by executing a first set of operations that are selected based on the first application schema;
        prior to transmitting the second response: generating, by the application, the second response by executing a second set of operations that are selected based on the second application schema, the second set of operations being different than the first set of operations, and the first request and the second request being substantially similar;
        receiving a first update for the base schema;
        applying the first update for the base schema to each of the first application schema and the second application schema;
        receiving a second update for the first application schema from the first tenant; and
        applying the second update to the first application schema without modifying either of the second application schema or the base schema.

11. The medium of claim 1, wherein a first caching policy of the first datastore and a second caching policy for the second datastore are different.

12. A method comprising:
    receiving, by an application from a first tenant, a first request for accessing a first data set stored in a first datastore organized according to a first application schema derived from a base schema;
    transmitting, by the application to the first tenant, a first response comprising at least a subset of the first data set;
    receiving, by the application from a second tenant, a second request for accessing a second data set stored in a second datastore organized according to a second application schema derived from the base schema, the second application schema being different than the first application schema;

transmitting, by the application to the second tenant, a second response comprising at least a subset of the second data set;

wherein the first datastore is associated with the first tenant and the second datastore is associated with the second tenant;

wherein the first datastore and the second datastore are associated with a same physical database, and a cache of the physical database performs caching for both the first datastore and the second datastore;

wherein at least one of the first datastore and the second datastore comprises a pluqqable database;

wherein a first update for the base schema is applied to the first application schema and is applied to the second application schema, and a second update for the first application schema is not applied to the base schema and is not applied to the second application schema.

13. The method of claim 12, further comprising:
prior to transmitting the first response: generating, by the application, the first response by executing a first set of operations that are selected based on the first application schema; and
prior to transmitting the second response: generating, by the application, the second response by executing a second set of operations that are selected based on the second application schema, the second set of operations being different than the first set of operations.

14. The method of claim 13, wherein the first request and the second request are substantially similar.

15. The method of claim 13, wherein the first request and the second request are identical.

16. The method of claim 12, wherein the first application schema includes references to a different number of data fields than the second application schema.

17. The method of claim 12, wherein the first datastore is associated with a first type of data structure, and wherein the second datastore is associated with a second type of data structure different than the first type of data structure.

18. The method of claim 12, further comprising:
receiving an update for the base schema; and
applying the update for the base schema to each of the first application schema and the second application schema.

19. The method of claim 12, wherein each of the first datastore and the second datastore comprises a separate pluggable database.

20. A system comprising:
at least one hardware device including a processor; and
the system configured to perform operations comprising:
receiving, by an application from a first tenant, a first request for accessing a first data set stored in a first datastore organized according to a first application schema derived from a base schema;
transmitting, by the application to the first tenant, a first response comprising at least a subset of the first data set;
receiving, by the application from a second tenant, a second request for accessing a second data set stored in a second datastore organized according to a second application schema derived from the base schema, the second application schema being different than the first application schema;
transmitting, by the application to the second tenant, a second response comprising at least a subset of the second data set;
wherein the first datastore is associated with the first tenant and the second datastore is associated with the second tenant;
wherein the first datastore and the second datastore are associated with a same physical database, and a cache of the physical database performs caching for both the first datastore and the second datastore;
wherein at least one of the first datastore and the second datastore comprises a pluqqable database;
wherein a first update for the base schema is applied to the first application schema and is applied to the second application schema, and a second update for the first application schema is not applied to the base schema and is not applied to the second application schema.

* * * * *

UNITED STATES PATENT AND TRADEMARK OFFICE
CERTIFICATE OF CORRECTION

PATENT NO. : 10,387,387 B2  
APPLICATION NO. : 14/973256  
DATED : August 20, 2019  
INVENTOR(S) : Lam et al.

Page 1 of 1

It is certified that error appears in the above-identified patent and that said Letters Patent is hereby corrected as shown below:

On the Title Page

On page 3, Column 1, under Other Publications, Line 19, delete "Administrators's" and insert -- Administrator's --, therefor.

In the Specification

In Column 1, Line 17, delete "61/707,726,filed" and insert -- 61/707,726, filed --, therefor.

In Column 14, Line 2, delete "Homelmprove" and insert -- HomeImprove --, therefor.

In Column 14, Line 3, delete "Homelmprove" and insert -- HomeImprove --, therefor.

In Column 14, Line 10, delete "Homelmprove" and insert -- HomeImprove --, therefor.

In Column 14, Line 19, delete "Homelmprove" and insert -- HomeImprove --, therefor.

In Column 14, Line 34, delete "Homelmprove" and insert -- HomeImprove --, therefor.

In the Claims

In Column 21, Line 16, in Claim 12, delete "pluqqable" and insert -- pluggable --, therefor.

In Column 22, Line 34, in Claim 20, delete "pluqqable" and insert -- pluggable --, therefor.

Signed and Sealed this  
Twenty-fifth Day of August, 2020

Andrei Iancu  
*Director of the United States Patent and Trademark Office*